(12) United States Patent
Blaukopf

(10) Patent No.: US 8,099,677 B2
(45) Date of Patent: Jan. 17, 2012

(54) METHOD AND APPARATUS FOR ANIMATION PROFILING

(75) Inventor: Jacob Benjamin Blaukopf, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 592 days.

(21) Appl. No.: 12/177,746

(22) Filed: Jul. 22, 2008

(65) Prior Publication Data

US 2010/0023880 A1   Jan. 28, 2010

(51) Int. Cl.
*G06F 3/048* (2006.01)
*G06F 3/00* (2006.01)

(52) U.S. Cl. ......... 715/789; 715/760; 715/745; 715/765
(58) Field of Classification Search .................. 715/789, 715/760, 765, 745
See application file for complete search history.

(56) References Cited

U.S. PATENT DOCUMENTS

| | | | | |
|---|---|---|---|---|
| 6,342,907 | B1 * | 1/2002 | Petty et al. | 715/762 |
| 7,728,838 | B2 * | 6/2010 | Forney et al. | 345/474 |
| 7,865,306 | B2 * | 1/2011 | Mays | 701/211 |
| 2002/0101431 | A1 * | 8/2002 | Forney et al. | 345/582 |
| 2004/0153788 | A1 * | 8/2004 | Krietemeyer et al. | 714/25 |
| 2004/0222992 | A1 * | 11/2004 | Calkins et al. | 345/473 |
| 2007/0067104 | A1 * | 3/2007 | Mays | 701/211 |

OTHER PUBLICATIONS

Schmitz P. et al: "Synchronized Multimedia Integration Language (SMIL 2.0), Chapter 3: The SMIL 2.0 Animation Modules" [Online]. Feb. 23, 2005. XP002523181.
International Search Report, PCT/US2008/080784, International Search Authority, European Patent Office, Apr. 24, 2009.
Written Opinion, PCT/US2008/080784, International Search Authority, European Patent Office, Apr. 24, 2009.

* cited by examiner

*Primary Examiner* — Weilun Lo
*Assistant Examiner* — Shashi Becker
(74) *Attorney, Agent, or Firm* — Nicholas A. Cole

(57) ABSTRACT

The present invention relates to a method for displaying moving items in a user interface and, in particular, to such a method for use within a device for use with a wireless communications network. The invention provides a method and apparatus for displaying a moving object in which the object is part of a user interface defined by a mark-up language and in which the movement of the object is defined by an arbitrary profile.

3 Claims, 5 Drawing Sheets

METHOD AND APPARATUS FOR ANIMATION PROFILING

FIELD OF THE INVENTION

The present invention generally relates to the display of information on wireless devices and more particularly relates to a method for displaying moving items in a user interface and to such a method for use within a device for use with a wireless communications network.

BACKGROUND

It is known to use a mark-up language to animate an object between two values in a linear or otherwise predetermined manner. It is also known to use graphical user interfaces for example such as that provided my Macromedia Flash™ to generate a graphical representation of an arbitrary animation profile.

The problem remains, how to control animation using a mark-up language according to an arbitrary profile when displaying a moving object defined by a mark-up language.

SUMMARY OF THE INVENTION

The invention provides a method of displaying a moving object in which the object is part of a user interface defined by a mark-up language and in which the movement of the object is defined by an arbitrary profile. The profile may be an attribute within a mark-up tag defining animations.

In one aspect the profile comprises a sequence of at least one value defining a proportion of a distance between a start point and an end point the object will move at least one point in time. The proportion may be defined to be less than 0% or greater than 100% to indicate movement outside a range defined by the start point and the end point.

In one aspect there is a plurality of points in time which are linearly spaced for a duration between a start time and an end time, in which case the duration between said points in time will be equal to the duration divided by the number of values in the sequence.

According to the invention there is also provided method of achieving complex animation effects in a user interface defined by a mark-up language by defining a movement of one or more objects.

According to another aspect of the invention there is also provided a device comprising a display and a user interface defined by a mark-up language, in which moving objects are displayed in operation according to an arbitrary profile. The profile may be an attribute within a mark-up tag defining animations.

In one aspect the profile comprises a sequence of at least one value defining a proportion of a distance between a start point and an end point the object will move at least one point in time. The proportion may be defined to be less than 0% or greater than 100% to indicate movement outside a range defined by the start point and the end point.

In one aspect there is a plurality of points in time which are linearly spaced for a duration between a start time and an end time such that the duration between said points in time will be equal to the duration divided by the number of values in the sequence less one.

According to a further aspect of the invention there is provided a device comprising means for displaying a user interface; and means for storing an arbitrary profile; in which the user interface is defined by a mark-up language, in which moving objects are displayed in operation according to the arbitrary profile. The profile may be an attribute within a mark-up tag defining animations.

In one aspect the profile comprises a sequence of at least one value defining a proportion of a distance between a start point and an end point the object will move at least one point in time. The proportion may be defined to be less than 0% or greater than 100% to indicate movement outside a range defined by the start point and the end point.

In one aspect there is a plurality of points in time which are linearly spaced for a duration between a start time and an end time such that the duration between said points in time will be equal to the duration divided by the number of values in the sequence less one.

According to another aspect of the invention there is provided a computer program product comprising: computer-readable medium comprising: at least one instruction for displaying a moving object in which the object is part of a user interface defined by a mark-up language; at least one stored arbitrary profile defining the movement of the object. The profile may be an attribute within a mark-up tag defining animations.

In one aspect the profile comprises a sequence of at least one value defining a proportion of a distance between a start point and an end point the object will move at least one point in time. The proportion may be defined to be less than 0% or greater than 100% to indicate movement outside a range defined by the start point and the end point.

In one aspect there is a plurality of points in time which are linearly spaced for a duration between a start time and an end time such that the duration between said points in time will be equal to the duration divided by the number of values in the sequence less one.

According to another aspect of the invention there is provided a server comprising a publishing component and a content server component, in which the content server component is arranged to receive user interface data from content feeds and in which the publishing component is arranged to package the user interface data for sending to one or more wireless devices, wherein the user interface data comprises a user interface defined by a mark-up language and in which movement of the object is defined by an arbitrary profile. The profile may be an attribute within a mark-up tag defining animations.

In one aspect the profile comprises a sequence of values defining a proportion of a distance between a start point and an end point the object will move at lease one point in time. The proportion may be defined to be less than 0% or greater than 100% which will indicate movement outside a range defined by the start point and the end point.

In one aspect there is a plurality of points in time which are linearly spaced for a duration between a start time and an end time such that the duration between said points in time will be equal to the duration divided by the number of values in the sequence less one.

BRIEF DESCRIPTION OF THE DRAWINGS

The invention will now be described, by way of example only, with reference to the accompanying drawings, in which.

Like references to elements within the drawings refer to like elements unless explicitly stated otherwise.

DETAILED DESCRIPTION

The word "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

In this description, the terms "communication device," "wireless device," "wireless telephone," "wireless communications device," and "wireless handset" are used interchangeably. With the advent of third generation (3G) wireless technology, more bandwidth availability has enabled more electronic devices with wireless capabilities. Therefore, a wireless device could be a cellular telephone, a pager, a PDA, a smartphone, a navigation device, or a computer with a wireless connection.

Figure 1:
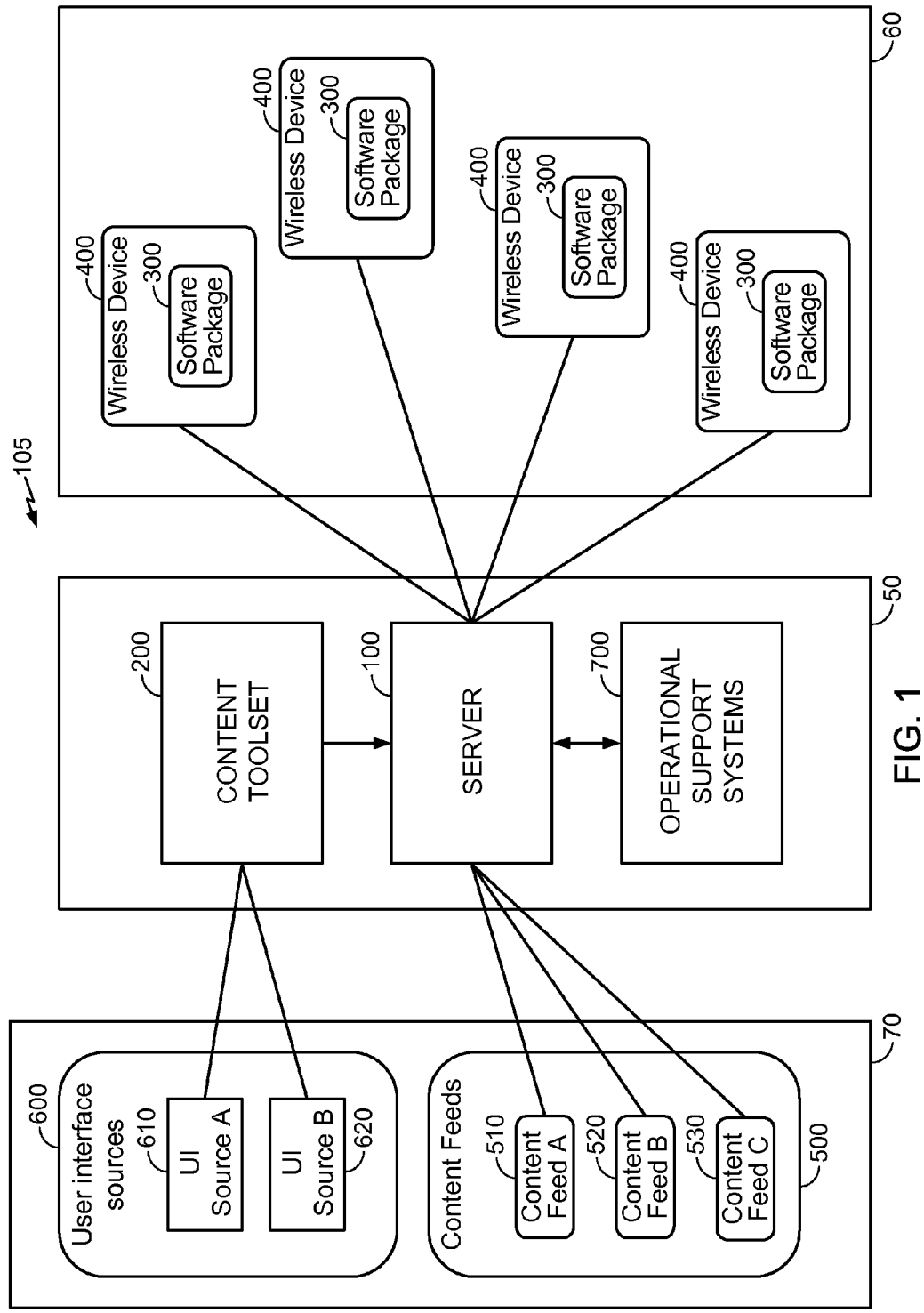
FIG. 1 shows a schematic depiction of a system.

Referring now to FIG. 1, an exemplary system 105 comprises server 100, content toolset 200, wireless devices 400, operational support systems (OSSs) 700, content feeds 500 and user interface (UI) sources 600. In use, the server 100 communicates content data and UI data to the wireless devices 400, each of which include software package 300. The server 100 interfaces with OSSs 700, with the OSSs 700 being those conventionally used to operate wireless networks, for example billing, account management, etc. The server 100 further interfaces with the content toolset 200: the content toolset 200 receives data from UI sources 610, 620, . . . , and packages the UI data such that the server can transmit the packaged UI data to the software packages 300 within the wireless devices 400. The server 100 receives data from a plurality of content feeds 510, 520, 530, and this data is processed and packaged such that it can be sent to the software packages 300 or so that the wireless devices 400 can access the data using the software package 300.

The exemplary system can be envisaged as being divided into three separate domains: an operator domain 50 comprises the systems and equipment operated by the mobile network operator ("MNO"); a user domain 60 comprises a plurality of wireless devices and a third-party domain 70 comprises the content feeds 500 and UI sources 600 that may be controlled or operated by a number of different entities.

Figure 2:
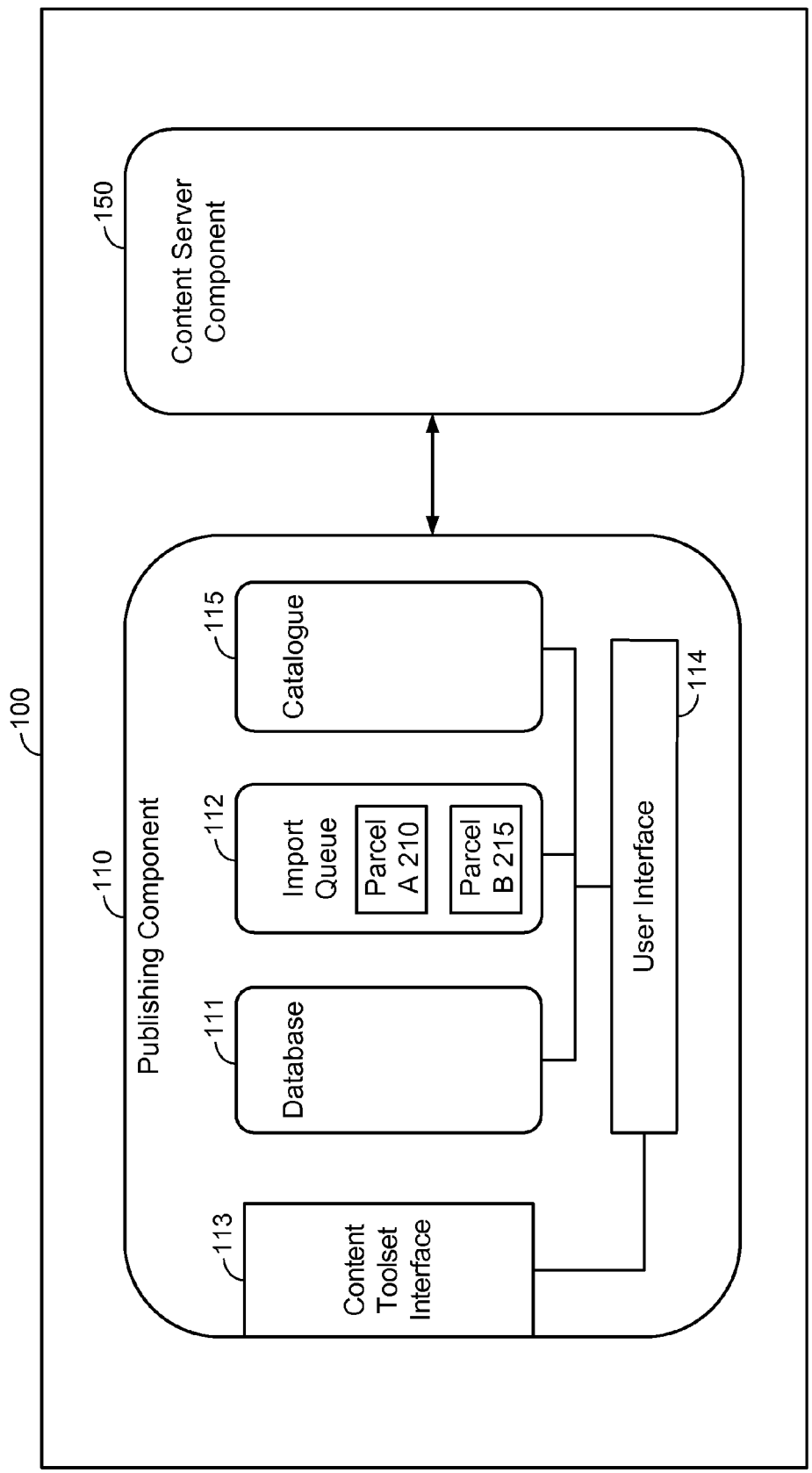
FIG. 2 depicts in greater detail the structure and operation of a server.

FIG. 2 depicts in greater detail the structure and operation of server 100. Server 100 comprises a publishing component 110 and a content server component 150. The publishing component 110 comprises a database 111, an import queue 112, a content toolset interface 113, a user interface 114 and a catalogue 115. In operation, the publishing component 110 receives content from the content toolset at the content toolset interface 113. The content is presented in the form of a parcel comprising one or more trigs and one or more triglets. A trig is a user interface for a wireless device and a triglet is a data file that can be used to update, eg extend, or alter a trig. If a parcel comprises more than one trig then one of the trigs may be a master trig from which the other trigs may be derived.

The publishing component user interface 114 can be used to import a parcel into the database 111, and this process may cause references to each trig and triglet to be loaded into the import queue 112, which may comprise references to a plurality of parcels 210a, 210b, The contents of the parcel may be examined using the user interface 114, and the contents of one of the parcels can be passed to the catalogue 115.

Update channels may be referenced by trigs to control the delivery of content. An update channel comprises a URL which is a link to a resource on the associated domain that contains a triglet. The URL can be polled at predefined intervals and the HTTP GET function used to access a parcel comprising the triglet (it will be readily appreciated that other transport schemes may be used with the present invention, for example SyncML, or SMS, or cell broadcast for small updates). The parcel comprising the triglet describes how a trig can be modified, e.g. replacing one or more images or text files used by the trig. The user interface 114 for the publishing component 110 enables an operator to define and control the update channels that exist for a domain, the URLs associated with each triglet on an update channel, and an association of each triglet with a corresponding update channel for a domain. As each triglet is associated with an update channel, an operator may enter the date and time that the update should be published, enabling a schedule to be set.

A content feed is similar to an update channel for which the content updates are automatically generated on a regular basis. A content feed is accessed by polling a URL, retrieving a parcel containing a triglet and applying it to the trig. However because of the different nature of manually constructed triglet updates and automatically generated content, update channels and content feeds are managed separately. One of skill in the art may utilize other transport schemes may be used such as SyncML or OMA-DM (Open Mobile Alliance Device Management).

Figure 3:
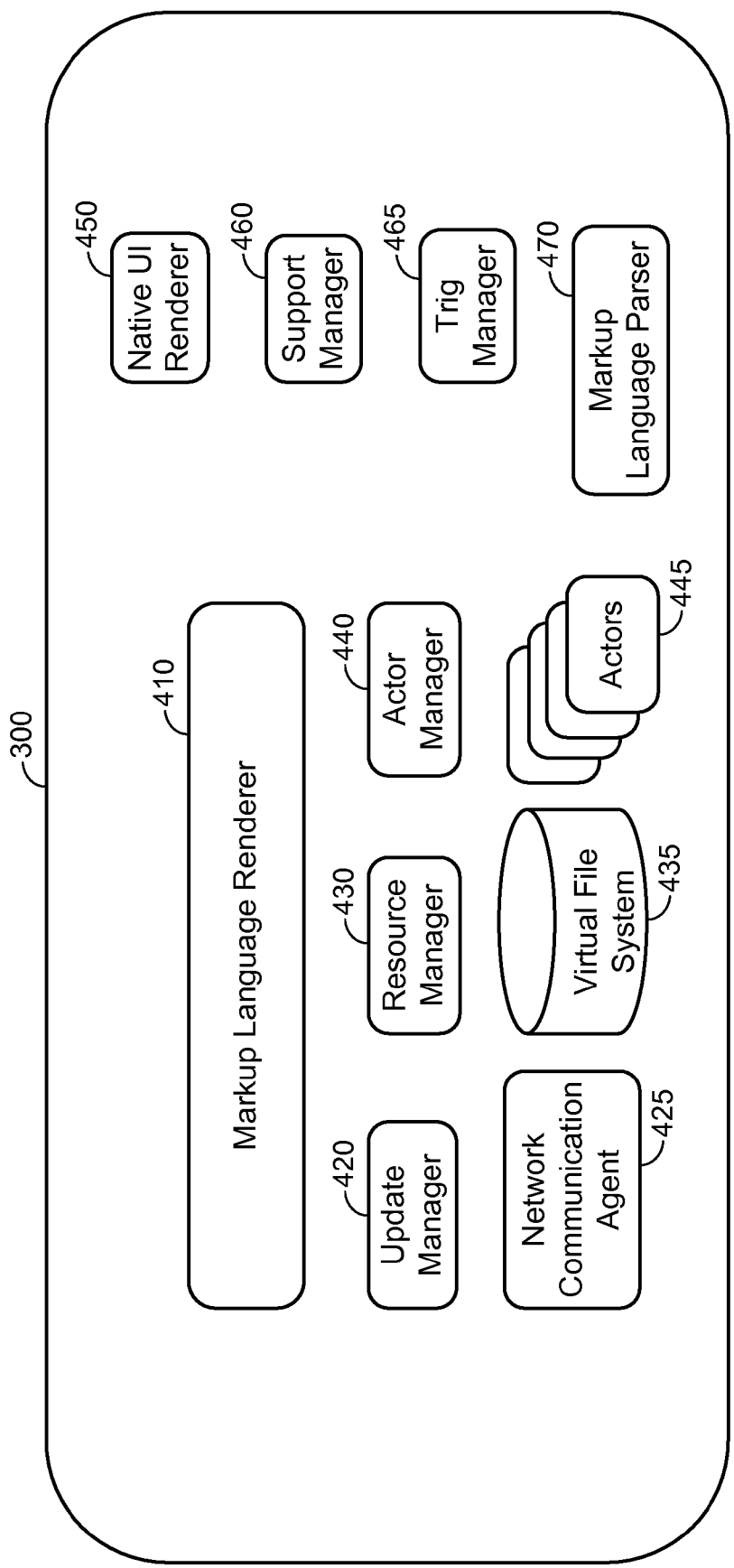
FIG. 3 shows a schematic depiction of software for wireless devices.

FIG. 3 shows a schematic depiction of exemplary software 300 for the wireless devices 400, which comprises a mark-up language renderer 410, update manager 420, network communication agent 425, resource manager 430, virtual file system 435, actor manager 440, a plurality of actors 445, native UI renderer 450, support manager 460, trig manager 465 and mark-up language parser 470.

The software 300 may operate using TrigML, which is an XML application mark up language. The mark-up language renderer 410 renders the TrigML code for display on the wireless device 300. The mark-up language renderer also uses the TrigML Parser to parse TrigML resources, display content on the device screen, and to control the replacement and viewing of content on the handset.

It may be desirable if content can be displayed in an interesting manner, one way in which this is achieved is by animation. In this context, animation means a visual effect which is applied to an object to be displayed. For example, an object may fly in from a side of the screen, may bounce off sides of the screen; fade from screen etc. one of skill in the art may devise countless animation schemes.

However, as the software operates using a mark-up language, in this case TrigML, an arbitrary profile may be defined by adding a profile tag to an XML tag defining animations (in TrigML, this is known as the anim tag).

Figure 4A:
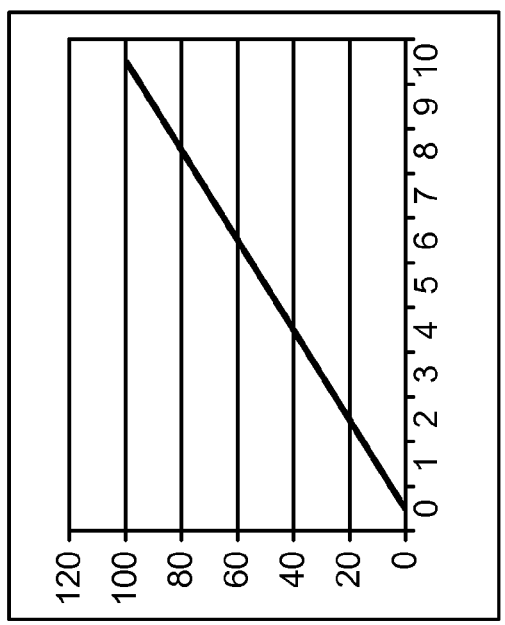
FIGS. 4*a*-4*c* illustrate schematically arbitrary animation profiles.

In prior implementations of the anim tag, a property (for example, the x position) is animated between the start and end point in a linear manner. For example:

<anim name="x" value="0:100" duration="1000"/> would produce an animation profile as shown in FIG. 4a.

The property x is animated between the values 0 and 100 over the course of one second (1000 ms).

In an improved method of animation the movement may be defined in terms of an arbitrary profile for example:

<anim name="x" values="0:100" duration="1000" Profile="0; 5; 20; 50; 85; 95; 102; 98; 101; 99; 100/>

Rather than animate in a linear manner such that x=100*t/1000 where t is time in milliseconds the animation follows an arbitrary profile. In this example the property x is animated from 0-5 over 100 ms, from 5-20 over 100 ms, then 20-50 over 100 ms etc. This results in an animation profile as shown in FIG. 4b.

In this example the animation defines a start point and an endpoint (0 and 100 respectively) and the profile comprises a sequence of values defining a proportion of the distance between the start point and the end point.

Figure 4C:
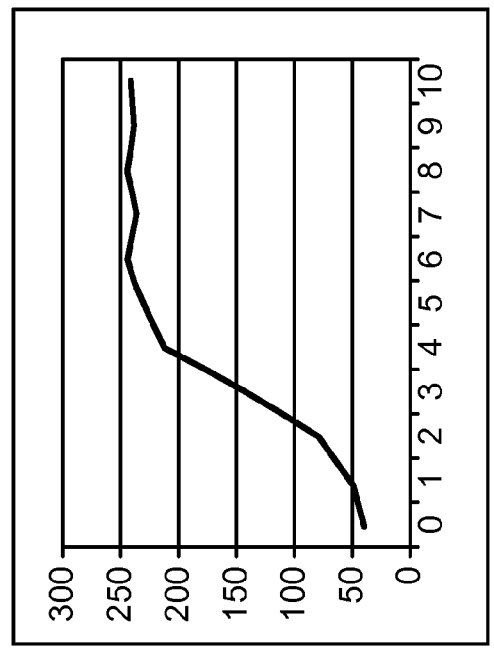
Figure 4B:
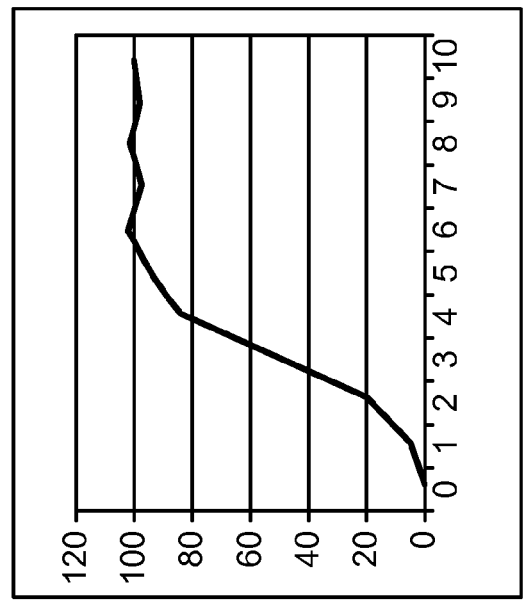

Therefore, if the start point and end point had been 40 and 240 respectively then the animation would appear as shown in FIG. 4c (i.e. scaled and shifted accordingly).

Profile values may be greater than 100%, and they may also be less than 0%. In this instance, the movement occurs outside the range defined by the start point and the end point as will be seen in further examples with reference to FIG. 5.

In this particular example, the profile defines the proportion of the range which has been moved at fixed points in time where the points in time are linearly spaced between a start time (0) and an end time (the duration). In this case, the time duration between each proportion and each subsequent proportion defined in the profile will be equal to the duration divided by the number of elements defined in the profile less one. Therefore, the duration between the time taken to reach each proportion and the time taken to reach each subsequent proportion is 100 ms in the example above.

It may be possible to devise profiles where the points in time were not linearly spaced, for example a profile could comprise a sequence of values indicating how much time it takes to reach linearly spaced proportions of the defined range. It is even possible to define profiles where both the spatial positions and the points in time are not linear although these could be quite complex.

In other aspects of the invention, the start time may be equal to values other than 0. The duration may be defined in any convenient unit.

Figure 5C:
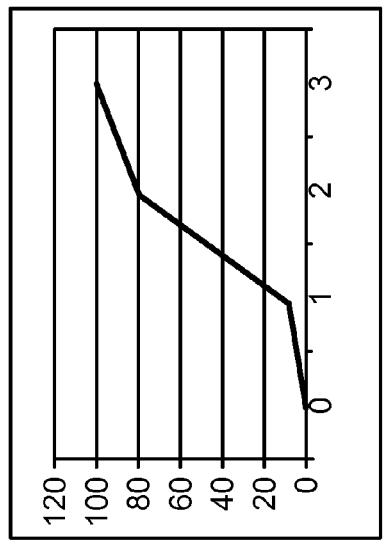
FIGS. 5a-5e illustrate schematically further arbitrary animation profiles.
Figure 5B:
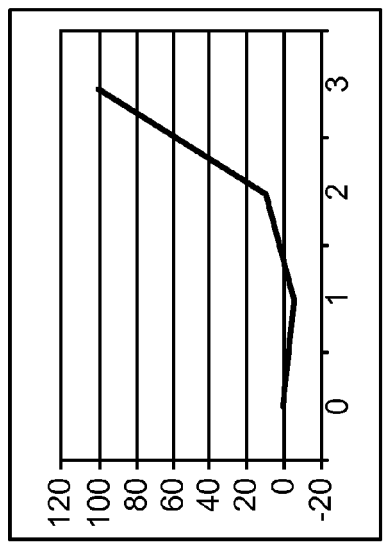
Figure 5A:
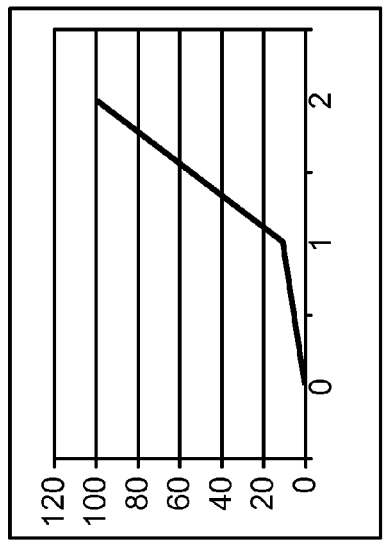
Figure 5E:
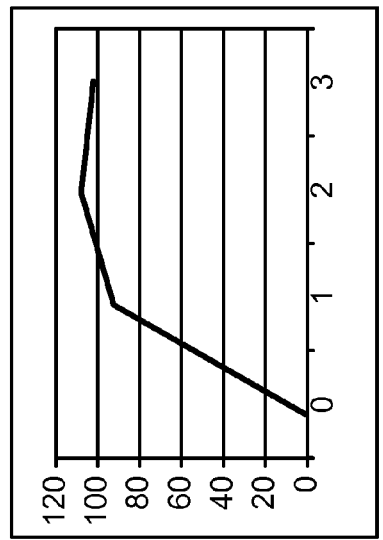
Figure 5D:
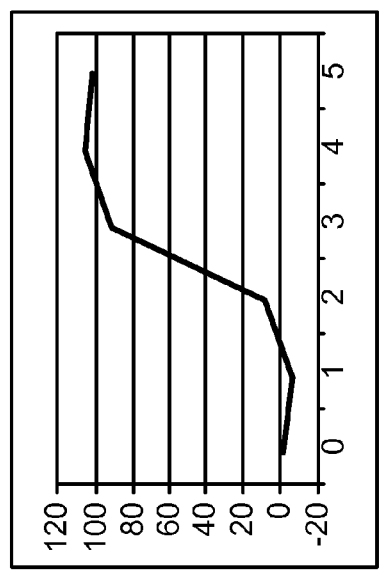

To illustrate the process further FIGS. 5a-5c illustrate movement of a property or object defined by profiles in Table 1 (below):

TABLE 1

| | |
|---|---|
| 5a | 0; 10; 100 |
| 5b | 0; −5; 10; 100 |
| 5c | 0; 10; 80; 100 |
| 5d | 0; −5; 10; 10; 105; 100 |
| 5e | 0; 90; 105; 100 |

The new method of profiling allows arbitrary control of animated object using a mark-up language. Complex effects may be achieved which would have previously required much more complex animation. For example, the animation illustrated in FIG. 4a would have taken ten separate animation elements.

Where data is accessed by means other than the file system, e.g. it is stored in a database, or it is generated on the fly by another software component, this scheme can still be used if a virtual file system 435 is used, which can map a file system interface onto the underlying provider of the data. This means the content can still be animated as described above, but the data can be provided in a method that enables efficient data storage and retrieval.

In one or more exemplary aspects, the functions described may be implemented in hardware, software, firmware, or any combination thereof. If implemented in software, the functions may be stored as one or more instructions or code on a non-transitory computer-readable medium. A non-transitory computer-readable storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

It is appreciated that certain features of the invention, which are, for clarity, described in the context of separate aspects, may also be provided in combination in a single aspect. Conversely, various features of the invention which are, for brevity, described in the context of a single aspect, may also be provided separately, or in any suitable combination.

It is to be recognized that various alterations, modifications, and/or additions may be introduced into the constructions and arrangements of parts described above without departing from the spirit or ambit of the present invention.

The invention claimed is:

1. A method of displaying a moving object in which the object is part of a user interface defined by a mark-up language, comprising:
defining movement of the object in an arbitrary profile in the form of an attribute within a mark-up tag defining animations comprising at least one value defining a proportion of a distance between a start point and an end point the object will move in a duration between a start time and an end time such that a movement interval for movement to each movement proportion value is equal to the duration divided by the number of proportion values plus one, wherein the proportion values be less than 0% and greater than 100% to indicate movement outside a range defined by the start point and the end point; and
rendering movement of the object in a user interface display sequentially from the start point to the end point by way of the at least one proportion values according to the profile in the mark-up tag.

2. A non-transitory computer-readable medium having stored thereon computer executable instructions configured to cause a computer to perform operations comprising:
displaying a moving object in which the object is part of a user interface defined by a mark-up language and movement of the object is defined in an arbitrary profile in the form of an attribute within a mark-up tag defining animations comprising at least one value defining a proportion of a distance between a start point and an end point the object will move in a duration between a start time and an end time such that a movement interval for movement to each movement proportion value is equal to the duration divided by the number of proportion values plus one, wherein the proportion values be less than 0% and greater than 100% to indicate movement outside a range defined by the start point and the end point.

3. An apparatus, comprising:
a processor;
a memory coupled to the processor; and
a user interface display coupled to the processor; wherein the processor is configured with processor-executable instructions to perform operations for displaying a moving object in which the object is part of a user interface defined by a mark-up language comprising:
  defining movement of the object in an arbitrary profile in the form of an attribute within a mark-up tag defining animations comprising at least one value defining a proportion of a distance between a start point and an end point the object will move in a duration between a start time and an end time such that a movement interval for movement to each movement proportion value is equal to the duration divided by the number of proportion values plus one, wherein the proportion values be less than 0% and greater than 100% to indicate movement outside a range defined by the start point and the end point; and
  rendering movement of the object in the user interface display sequentially from the start point to the end point by way of the at least one proportion values according to the profile in the mark-up tag.

* * * * *